US010253853B2

(12) United States Patent  
Pydin (10) Patent No.: US 10,253,853 B2  
(45) Date of Patent: Apr. 9, 2019

(54) STEPLESS TRANSMISSION

(71) Applicant: HONDA MOTOR CO., LTD., Tokyo (JP)

(72) Inventor: Andrii Pydin, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 15/513,803

(22) PCT Filed: May 13, 2015

(86) PCT No.: PCT/JP2015/063748  
§ 371 (c)(1),  
(2) Date: Mar. 23, 2017

(87) PCT Pub. No.: WO2016/051845  
PCT Pub. Date: Apr. 7, 2016

(65) Prior Publication Data  
US 2018/0231109 A1    Aug. 16, 2018

(30) Foreign Application Priority Data  
Sep. 29, 2014   (JP) .................................. 2014-198806

(51) Int. Cl.  
*F16H 9/16*     (2006.01)  
*F16H 9/20*     (2006.01)  
(Continued)

(52) U.S. Cl.  
CPC ................ *F16H 9/16* (2013.01); *F16H 9/20* (2013.01); *F16H 55/48* (2013.01); *F16H 55/52* (2013.01);  
(Continued)

(58) Field of Classification Search  
CPC ...... F16H 55/56; F16H 55/566; F16H 63/067; Y10T 403/7056; Y10T 403/7058  
(Continued)

(56) References Cited

U.S. PATENT DOCUMENTS 1,738,552 A * 12/1929 Abbott .................. F16H 9/24  
474/138  
2,054,564 A *  9/1936 Quiroz ................... F16H 9/14  
474/20  
(Continued)

FOREIGN PATENT DOCUMENTS

JP             68-2448 U      1/1983  
JP             63-89458 U     6/1988  
(Continued)

OTHER PUBLICATIONS

International Search Report dated Aug. 18, 2015, issued in counterpart International Application No. PCT/JP2015/063748 (2 pages).

*Primary Examiner* — Henry Y Liu  
(74) *Attorney, Agent, or Firm* — Westerman, Hattori, Daniels & Adrian, LLP (57) ABSTRACT

A stepless transmission transmits a driving force by an endless transmission member (5) wound around a V-groove (6) of an input pulley (1). The input pulley (1) has moving parts (9) which are fastened by threaded engagement so as to be axially movable with respect to a transmission case (3) and have ring gears (10), to which rotation can be input from the outer periphery sides, and pulley half discs (13) which are relatively rotatable with respect to the moving parts (9), which axially move integrally with the moving parts (9) and which are contactable with an endless transmission member (5). The pulley half discs (13) and an input shaft 2, which is disposed at the center of the pulley half discs (13), rotate (Continued)

together as one piece. The ring gears (10) are each rotationally driven from a drive source of the same drive member.

5 Claims, 8 Drawing Sheets

(51) Int. Cl.
  *F16H 55/48* (2006.01)
  *F16H 55/52* (2006.01)
  *F16H 55/54* (2006.01)
  *F16H 55/56* (2006.01)
  *F16H 59/70* (2006.01)
(52) U.S. Cl.
  CPC ............ *F16H 55/54* (2013.01); *F16H 55/56* (2013.01); *F16H 59/70* (2013.01); *F16H 2059/702* (2013.01)
(58) Field of Classification Search
  USPC ........................................................ 474/39, 41
  See application file for complete search history.

(56) References Cited

U.S. PATENT DOCUMENTS

| | | | | | |
|---|---|---|---|---|---|
| 2,199,569 | A | * | 5/1940 | Morse | F16H 7/02 474/23 |
| 2,200,101 | A | * | 5/1940 | Schmitter | F16H 9/12 474/25 |
| 2,245,667 | A | * | 6/1941 | Heyer | F16H 9/18 474/29 |
| 2,639,621 | A | * | 5/1953 | Harris | F16H 55/566 403/370 |
| 2,717,519 | A | * | 9/1955 | Kooistra | F16H 55/566 116/290 |
| 2,816,452 | A | * | 12/1957 | McCloskey | F16H 55/566 403/167 |
| 3,434,641 | A | * | 3/1969 | Ambros | F16H 61/6625 226/188 |
| 4,557,705 | A | * | 12/1985 | Shimizu | F16H 55/56 474/13 |
| 4,913,685 | A | * | 4/1990 | Lukatsch | F16H 9/10 474/49 |
| 6,626,778 | B1 | * | 9/2003 | Kapaan | F16H 55/56 474/20 |
| 6,908,405 | B2 | * | 6/2005 | Otaki | F16H 55/56 474/39 |
| 7,980,972 | B1 | * | 7/2011 | Starkey | F16H 63/062 474/39 |
| 7,980,973 | B1 | * | 7/2011 | Starkey | F16H 63/062 474/18 |
| 2009/0270209 | A1 | * | 10/2009 | Lindkvist | F16H 9/20 474/30 |

FOREIGN PATENT DOCUMENTS

| | | |
|---|---|---|
| JP | 11-13846 A | 1/1999 |
| JP | 2002-537529 A | 11/2002 |
| JP | 2004-156686 A | 6/2004 |
| JP | 2004-225809 A | 8/2004 |
| JP | 2005-53344 A | 3/2005 |
| JP | 2005-506500 A | 3/2005 |
| JP | 2013-160373 A | 8/2013 |
| WO | 00/49313 A1 | 8/2000 |
| WO | 03/036134 A1 | 5/2003 |
| WO | 2004/080703 A1 | 9/2004 |

* cited by examiner

STEPLESS TRANSMISSION

TECHNICAL FIELD

The present invention relates to a stepless transmission provided with pulleys.

BACKGROUND ART

Hitherto, there has been known a stepless transmission in which an endless transmission member composed of a band-like belt is wound between an input pulley and an output pulley, and the gear ratio is changed by changing the widths of the V-grooves of the input pulley and the output pulley (refer to, for example, Japanese Translation of PCT International Application Publication No. 2005-506500).

According to the stepless transmission described in Japanese Translation of PCT International Application Publication No. 2005-506500, a ball screw is provided in a rotating shaft so as to maintain the travel distances of the right and left halves of a pulley to be equal by the ball screw, thereby preventing the endless transmission member from being distorted.

CITATION LIST

Patent Literature

Patent Literature 1: Japanese Translation of PCT International Application Publication No. 2005-506500

SUMMARY OF INVENTION

Technical Problem

In the conventional stepless transmission, the ball screw is provided in the rotating shaft, posing a problem in that the diameter of an input shaft has to be increased, leading to an increase in the size of the stepless transmission.

In view of the above, an object of the present invention is to provide a stepless transmission capable of suppressing an increase in size and also preventing an endless transmission member from being distorted.

Solution to Problem

To this end, the present invention provides a stepless transmission including:

an input pulley and an output pulley, which have pulley faces forming V-grooves; and an endless transmission member wound around the V-grooves of the input pulley and the output pulley to transmit a driving force, wherein each of the input pulley and the output pulley is composed of a pair of halves having the pulley faces, each of the pair of halves of at least either the input pulley or the output pulley has:

a fixed part secured to a transmission case;

a first member which is fastened by threaded engagement to the fixed part so as to be axially movable and which has a ring gear to which rotation can be input from an outer periphery side, and a second member which is relatively rotatable with respect to the first member and axially moved integrally with the first member and which is contactable with the endless transmission member, a rotating shaft is disposed at a center of rotation of the second member, the second member rotates integrally with the rotating shaft, and wherein driving force of a drive source is transmitted to a pair of the first members through an intermediary of the ring gear.

According to the present invention, the travel distances of the pair of the pulley halves can be maintained to be the same, thus making it possible to prevent the distortion of the endless transmission member. Further, power is transmitted from the outer side through the ring gears, so that the rotating shaft does not have to have a larger diameter than necessary and an increase in the sizes of the pulleys is prevented, as compared with the stepless transmission adapted to transmit power from inside the rotating shaft. This makes it possible to suppress an increase in the size of the stepless transmission.

Further, in the present invention, spiral directions of the threadedly engaged portions of the first members and the fixed parts of the pair of the halves are different from each other. With this arrangement, the pair of the halves can be configured in the same shape except for the spiral machining process for the threadedly engaged portions of the first members and the fixed parts, thus permitting commonality of the components. Further, the different spiral directions obviate the need for reversing the rotational direction through an intermediate gear when transmitting the rotation to one half, so that the manufacturing cost of the stepless transmission can be reduced, as compared with the case where the intermediate gear is provided.

Further, in the present invention, a plurality of threadedly engaged portions at which the first member and the fixed part of the half are fastened by threaded engagement are preferably provided with, an interval existing in a radial direction of the half. This arrangement enables a lateral pressure of the pulley to be properly applied so as to prevent the pulley from being distorted.

Further, in the present invention, a pinion meshing with the ring gear, and a pinion shaft which journals the pinion so as to rotate integrally with the pinion are provided, and the driving force of a drive source is transmitted to the pinion shaft, thereby enabling the first member to rotate.

DESCRIPTION OF EMBODIMENTS

First Embodiment

Referring to FIG. 1 to FIG. 6, a first embodiment of the stepless transmission in accordance with the present invention will be described. The stepless transmission of the present embodiment includes an input pulley, an output pulley, and a band-like endless transmission member composed of a belt (or chain) wound between the two pulleys. In the present embodiment, the input pulley and the output pulley have the same configuration, so that the input pulley will be described in detail and the detailed description of the output pulley will be omitted.

Figure 1:
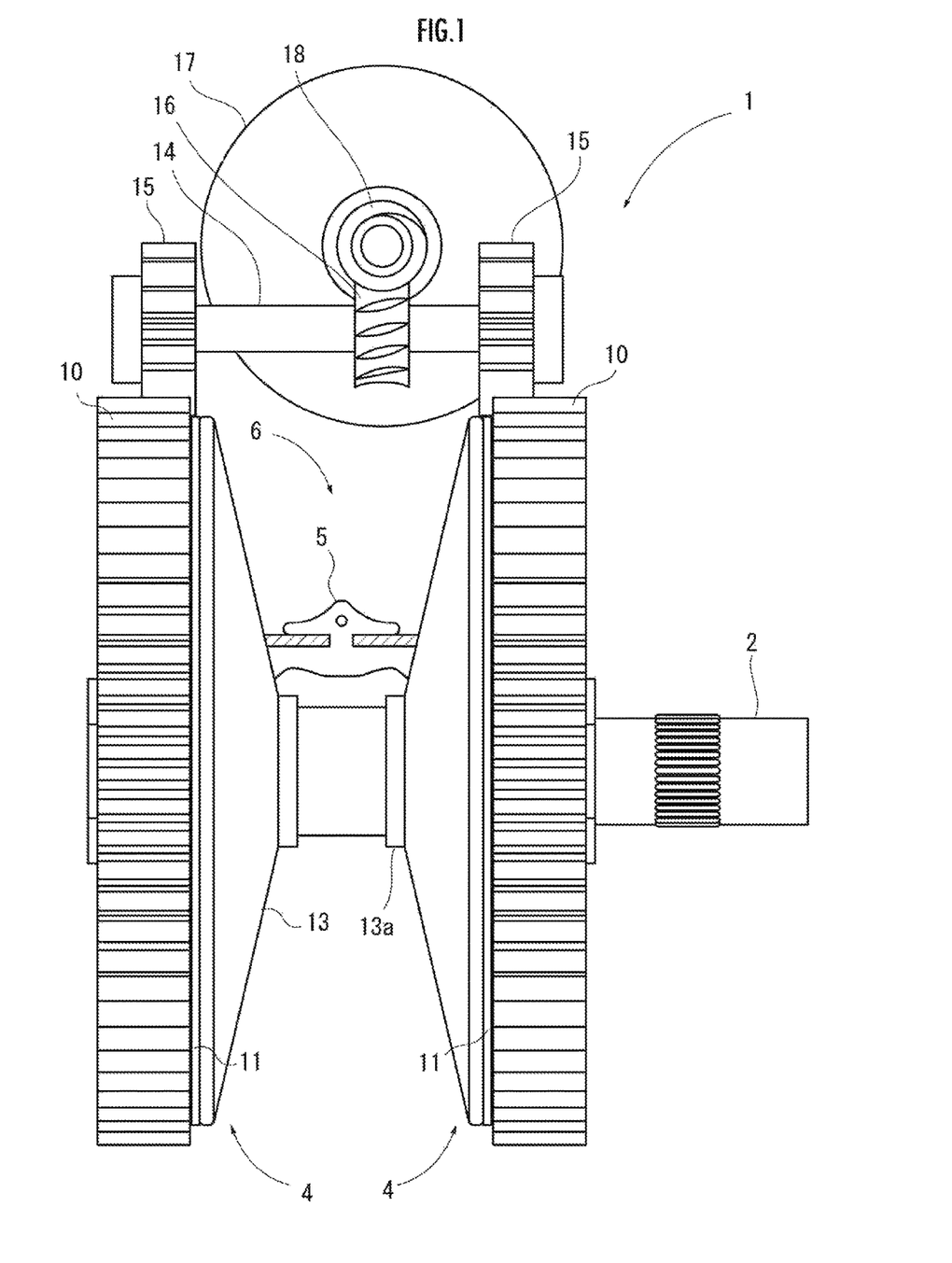
FIG. 1 is an explanatory diagram illustrating a first embodiment of a stepless transmission in accordance with the present invention.
Figure 2:
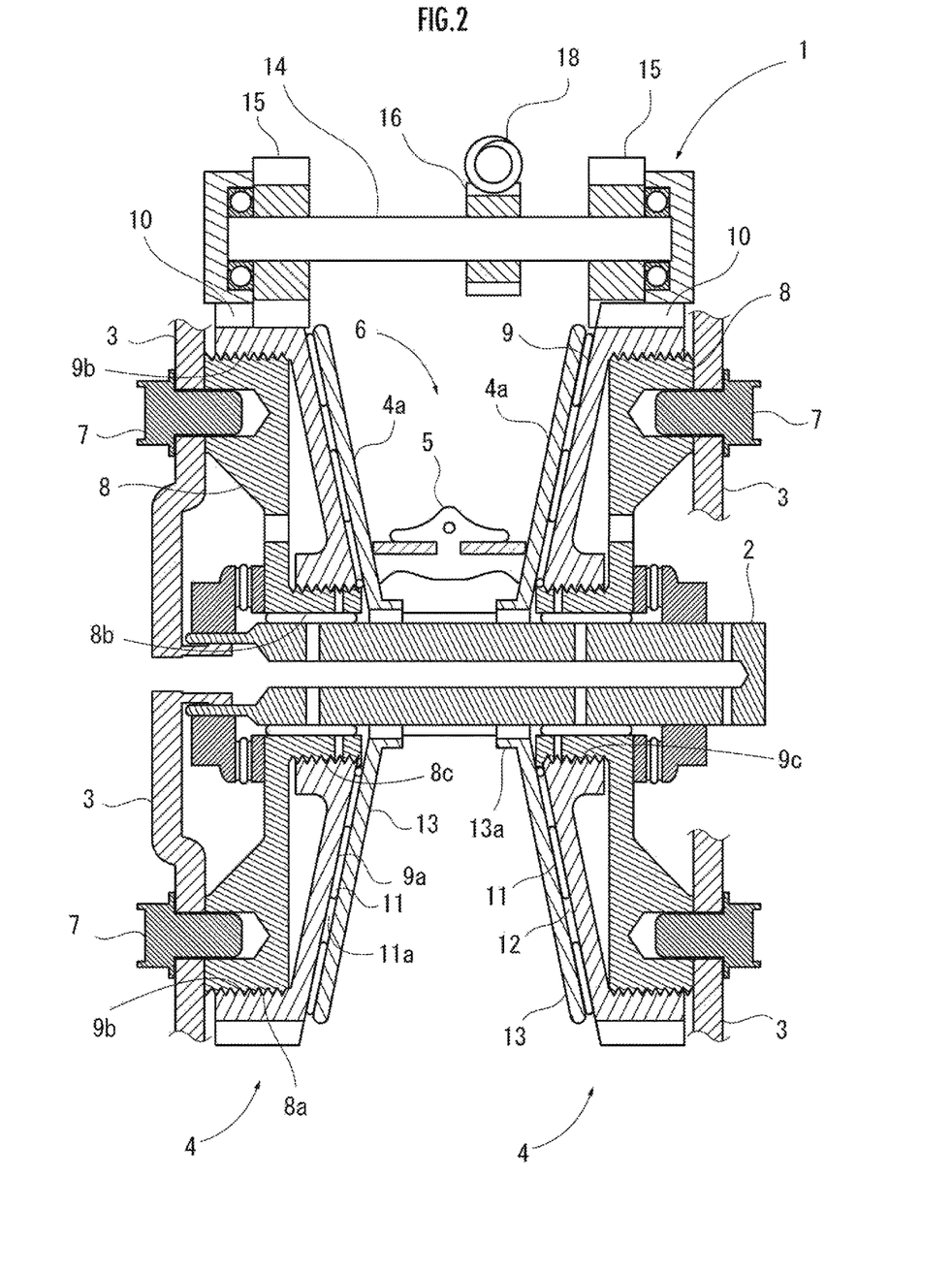
FIG. 2 is a sectional view illustrating the stepless transmission of the first embodiment.

As illustrated in FIG. 1, an input pulley 1 is provided on an input shaft 2 as the rotating shaft to which power from an internal-combustion engine or a motor is transmitted. As illustrated in FIG. 2, the input shaft 2 is rotatably journaled on a transmission case 3, which houses the input pulley 1. The input pulley 1 is composed of a pair of pulley halves 4.

The pulley halves 4 have pulley faces 4a that form a V-groove 6 in which an endless transmission member 5 is wound. Each of the pulley halves 4 has a fixed part 8 secured to the transmission case 3 by bolts 7. The outer periphery of the fixed part 8 is provided with an outer external thread 8a. A moving part 9 having a conical tapered face 9a of the same shape as the pulley face 4a forming the V-groove is threadedly attached to the outer external thread 8a thereby to be fastened by the threaded engagement. In the present embodiment, the moving part 9 corresponds to a first member of the present invention.

Figure 3:
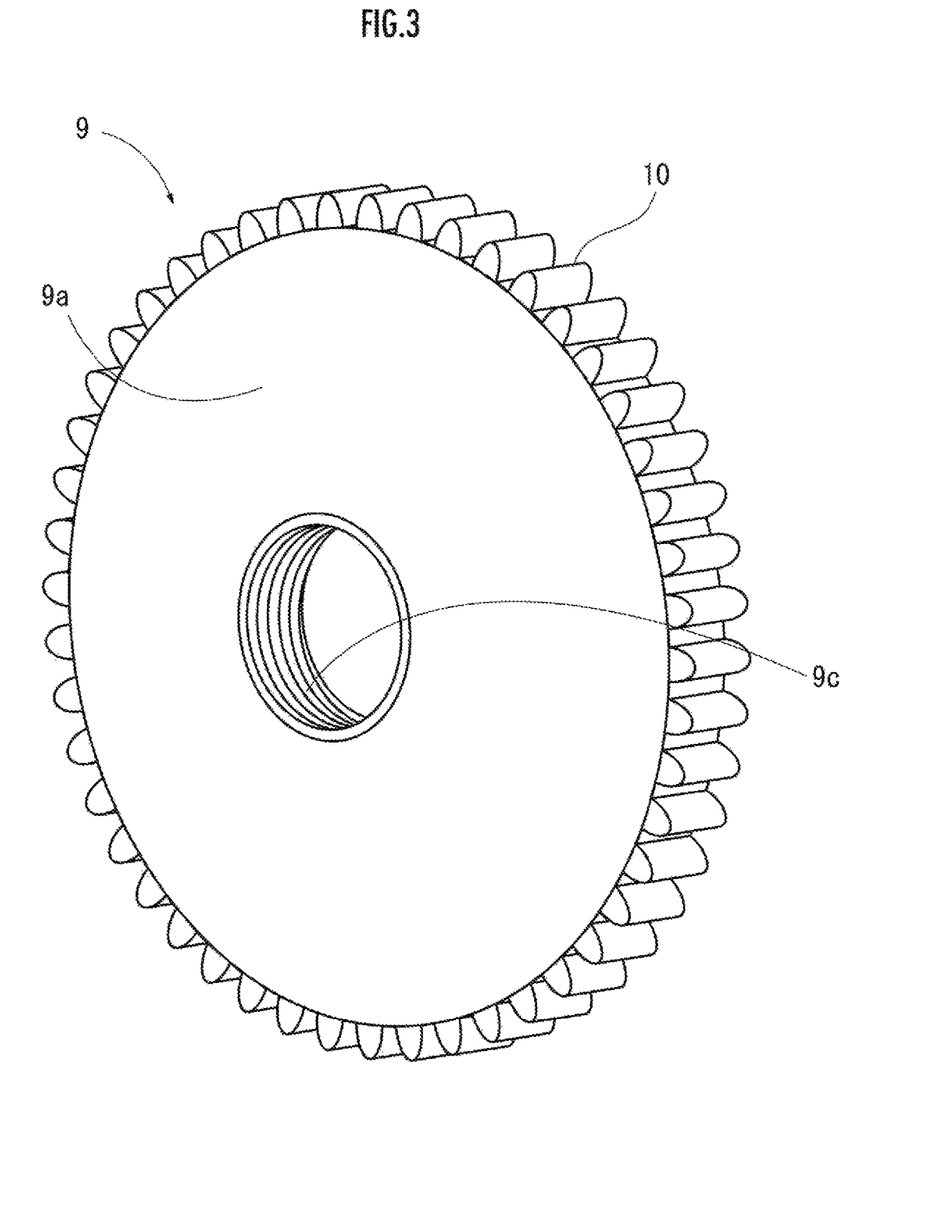
FIG. 3 is a perspective view illustrating a ring gear of the first embodiment.

As illustrated in FIG. 2, an outer internal thread 9b, which threadedly engages with the outer external thread 8a, is formed on the inner peripheral surface of the moving part 9. The outer external thread 8a and the outer internal thread 9b correspond to a threadedly engaged portion in the present embodiment. As illustrated in FIG. 3, a ring gear 10 is provided on the outer peripheral surface of the moving part 9.

Figure 4:
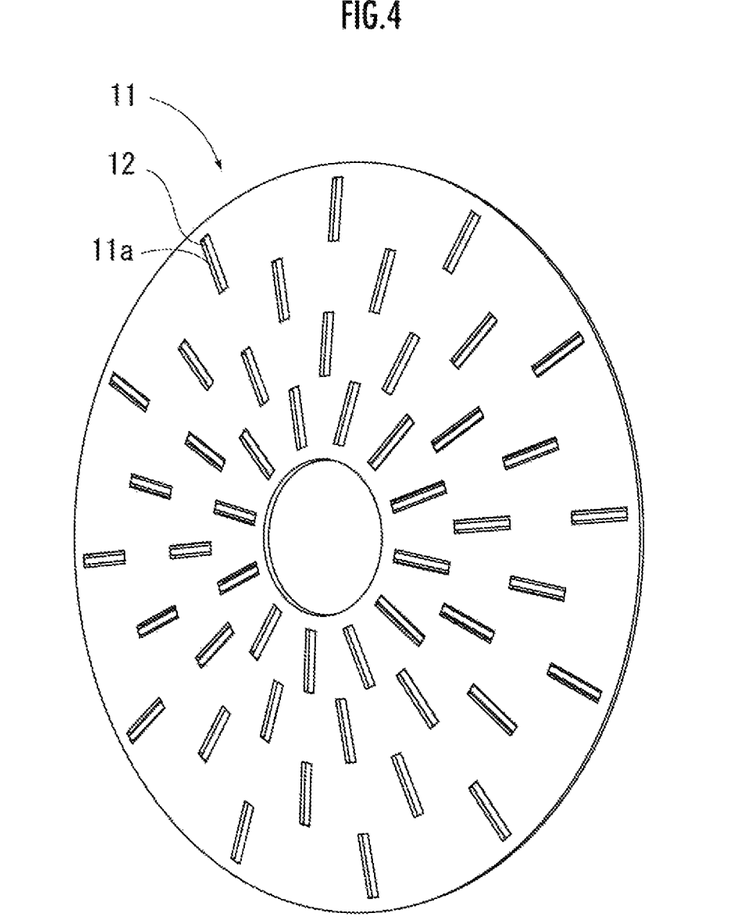
FIG. 4 is a perspective view illustrating a friction reducing part of the stepless transmission of the first embodiment.

Further, as illustrated in FIG. 2, a conical-plate-shaped friction reducing part 11 having the same shape as the tapered face 9a is disposed on the tapered face 9a of the moving part 9. As illustrated in FIG. 4, the friction reducing part 11 has rectangular through holes 11a, which are provided at a plurality of locations and which extend in a radial direction. Each of the through holes 11a houses a columnar roller 12.

A conical-plate-shaped pulley half disc 13 having the same shape as the friction reducing part 11 is disposed on the surface of the friction reducing part 11, which surface being the opposite side from the moving part 9 adjacent thereto. The pulley half disc 13 slides on the tapered face 9a (the front surface) of the moving part 9 through the intermediary of the friction reducing part 11. The pulley half disc 13 is provided with a pulley face 4a, which comes in contact with the endless transmission member 5 and constitutes the V-groove 6. The pulley half disc 13 axially moves integrally with the moving part 9. In the present embodiment, the pulley half disc 13 corresponds to the second member in the present invention.

Figure 5:
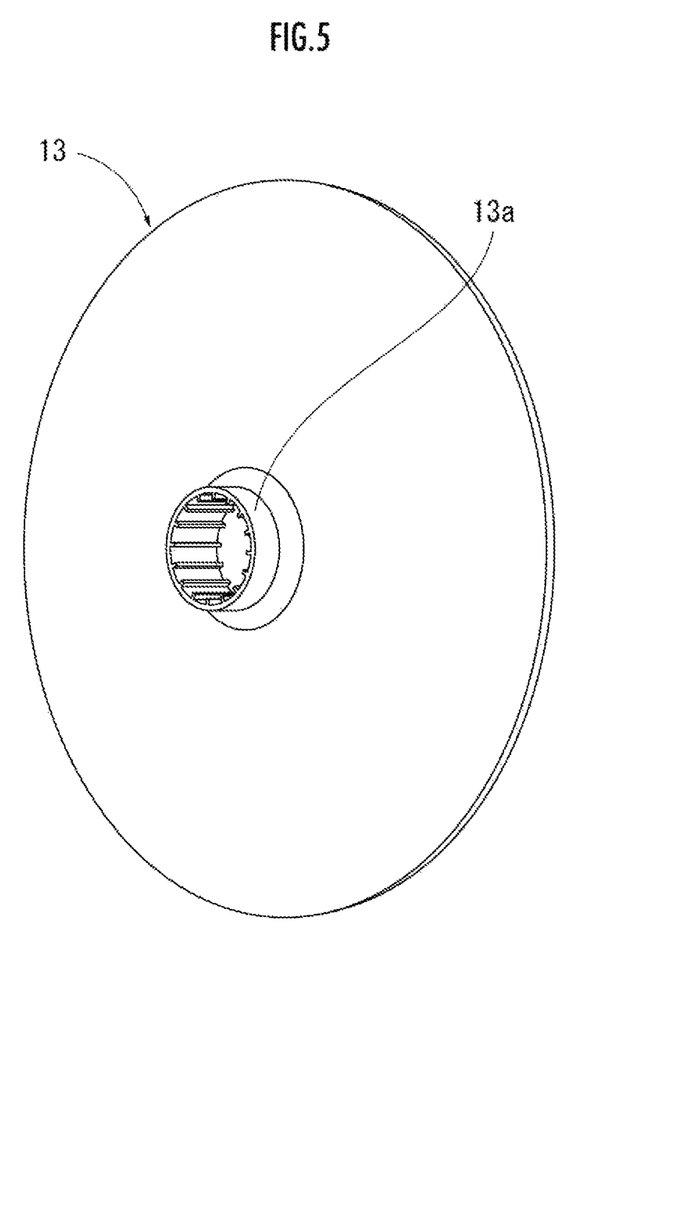
FIG. 5 is a perspective view illustrating a second pulley of the stepless transmission of the first embodiment.

As illustrated in FIG. 5, a cylindrical portion 13a splined to the input shaft 2 is provided in a radial inner end portion of the pulley half disc 13. Thus, the pulley half disc 13 rotates integrally with the input shaft 2, the input shaft 2 being the center of rotation. Further, the pulley half disc 13 is relatively rotatable with respect to the moving part 9.

As illustrated in FIG. 2, pinions 15 journaled by a pinion shaft 14 meth with the ring gears 10 of the moving parts 9 so as to integrally rotate. The pinion shaft 14 journals a driven gear 16 positioned between the pair of the pinions 15. A drive gear 18, to which the rotation of a drive source 17 composed of a motor is transmitted, meshes with the driven gear 16.

Figure 6:
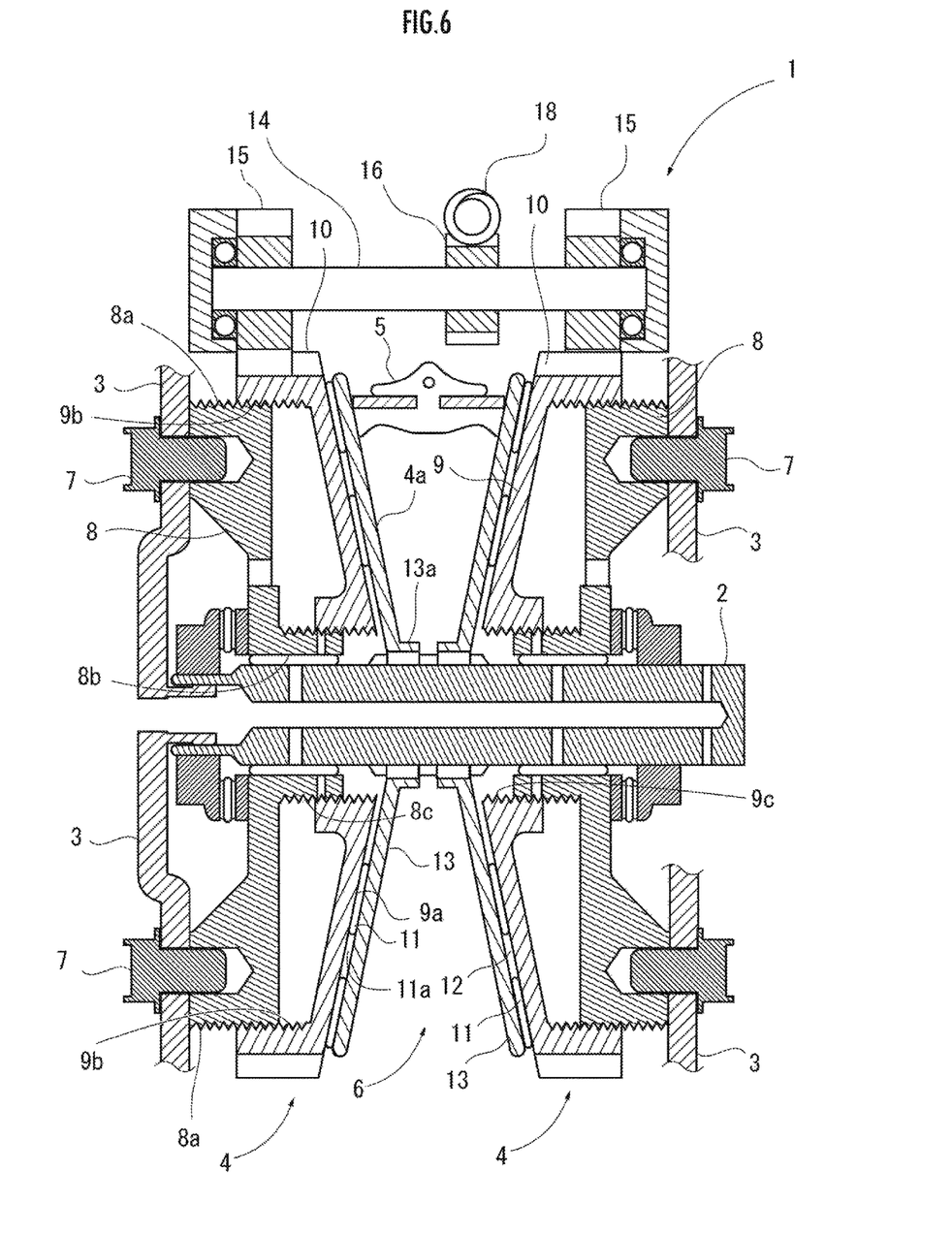
FIG. 6 is a sectional view illustrating a state in which the widths of the V-grooves of the stepless transmission of the first embodiment have been reduced, causing the winding diameter of an endless transmission member to increase.

When the pinion shaft 14 is rotated to one side by the driving force of the drive source 17, the moving parts 9 move in directions to be closer to each other, so that the width of the V-groove 6 is decreased, thus causing the winding radius of the endless transmission member 5 to be increased, as illustrated in FIG. 6. This causes the gear ratio (the rotational speed of the input shaft/the rotational speed of the output shaft) of the stepless transmission to increase, as compared with that in the state illustrated in FIG. 2.

Conversely, when the pinion shaft 14 is rotated to the other side by the driving force of the drive source 17, the moving parts 9 move in a direction to be away from each other, so that the width of the V-groove 6 is increased, thus causing the winding radius of the endless transmission member 5 to be decreased, as illustrated in FIG. 2. This causes the gear ratio (the rotational speed of the input shaft/the rotational speed of the output shaft) of the stepless transmission to decrease, as compared with that in the state illustrated in FIG. 6. The stepless transmission of the present embodiment changes the gear ratio by adjusting the winding radius of the endless transmission member 5 as described above.

According to the stepless transmission of the first embodiment, the travel distances of the pair of the pulley halves 4 can be maintained to be equal, so that the distortion of the endless transmission member 5 can be prevented. In addition, the power can be transmitted from the outer side (i.e. the outer periphery side) of the input pulley 1 through the intermediary of the ring gears 10 to input the rotation, so that there is no need to make the diameters of the input shaft 2 and the input pulley 1 large, thus making it possible to suppress an increase of the size of the stepless transmission, as compared with the conventional stepless transmission adapted to transmit the power from inside the input shaft 2.

Further, in the stepless transmission of the first embodiment, the threadedly engaged portions at which the moving parts 9 as the first members and the transmission cases 3 are threadedly engaged through the outer external threads 8a of the fixed parts 8 and the outer internal threads 9b have different spiral directions at both ends of the input shaft 2. This arrangement makes it possible to form the moving parts 9, which are the first members and have the threadedly engaged portions, and the fixed parts 8, which have the threadedly engaged portions and which are provided on the transmission cases 3 in the same shape except for the spiral direction in machining (spiral groove machining), thus permitting lower manufacturing cost of the stepless transmission due to the commonality of the components.

Further, a cylindrical portion 8b, which extends toward the moving part 9 adjacent thereto, is provided at the radial inner end portion of the fixed part 8 in the first embodiment. The outer periphery of the cylindrical portion 8b is provided with an inner external thread 8c. The radial inner end portion of the moving part 9 is provided with an inner internal thread 9c, which threadedly engages with the inner external thread 8c. As described above, the threadedly engaged portions are provided not only at the radial outer end portion but also at the radial inner end portion of the pulley half 4, thus making it possible to appropriately apply the lateral pressures to the pulley halves 4 so as to prevent uneven lateral pressures from being applied to the radial outer side and the radial inner side of the pulley halves 4 and therefore prevent the pulley halves 4 from being distorted.

Further, the fixed parts 8 are secured to the transmission cases 3, and the moving parts 9 do not rotate when the gear ratio is maintained. Hence, in the stepless transmission of the present embodiment, while the gear ratio is maintained, only the pulley half discs 13 as the second members rotate, and the fixed parts 8 and the moving parts 9 do not rotate. Hence, the stepless transmission of the present embodiment permits a reduction in the substantial mass of the pulley halves 4 when power is transmitted and therefore enables the power loss to be suppressed.

Further, in the stepless transmission of the present embodiment, the friction reducing part 11 having the rollers 12 as the plurality of rolling elements arranged with intervals provided in the circumferential direction, is provided between the moving part 9 and the pulley half disc 13.

The friction reducing part 11 permits a reduction in the friction between the moving part 9 as the first pulley half and the pulley half disc 13. This enables the pulley half disc 13 to smoothly rotate, contributing to a further reduction in the power loss. In addition, the friction reducing part 11 has the plurality of the rollers 12 as the rolling elements arranged with intervals provided thereamong in the circumferential direction, allowing the pulley half disc 13 to stably rotate.

In the present embodiment, the description has been given of the case where the output pulley has the same configuration as that of the input pulley 1; however, the moving halves of the output pulley in the present invention are not limited thereto. A different configuration may be adopted for the moving halves of the output pulley insofar as the width of the V-groove decreases as the width of the V-groove 6 of the input pulley 1 increases, while the width of the V-groove increases as the width of the V-groove 6 of the input pulley 1 decreases. Therefore, for example, the moving halves of the output pulley may be configured to be biased to one side by a spring.

Second Embodiment

Figure 7:
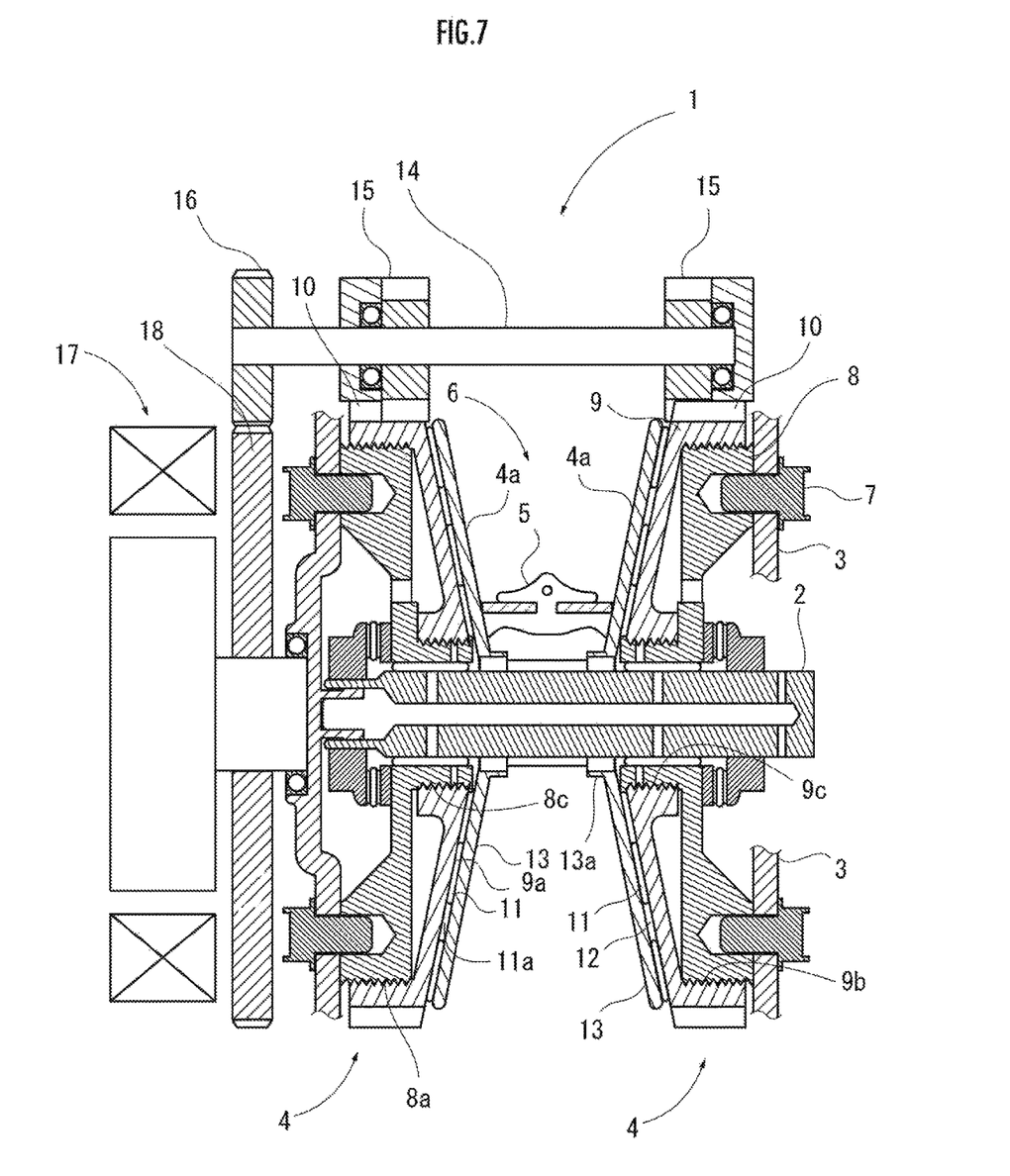
FIG. 7 is an explanatory diagram illustrating a second embodiment of a stepless transmission in accordance with the present invention.

Referring now to FIG. 7, a stepless transmission of a second embodiment in accordance with the present invention will be described. The stepless transmission of the second embodiment has the same configuration as that of the first embodiment except for the locations of a drive source 17, a driven gear 16 and a drive gear 18 for changing the gear ratio. Hence, the same components as those in the first embodiment will be assigned the same reference numerals and the description thereof will be omitted.

The drive source 17 of the second embodiment is positioned concentrically with an input shaft 2 of an input pulley 1. The driven gear 16 is provided on one end (the left end in FIG. 7) of a pinion shaft 14 so as to be closer to the one end than a pair of pinions 15 is. The drive source 17 of the second embodiment meshes with the driven gear 16 through the drive gear 18 to rotate the pinion shaft 14 thereby to make the gear ratio changeable.

As with the stepless transmission of the first embodiment, the stepless transmission of the second embodiment is also capable of maintaining the travel distances of a pair of pulley halves 4 to be the same, thus making it possible to prevent the distortion of an endless transmission member 5 caused by unequal travel distances of the pair of the pulley halves 4.

Third Embodiment

Figure 8:
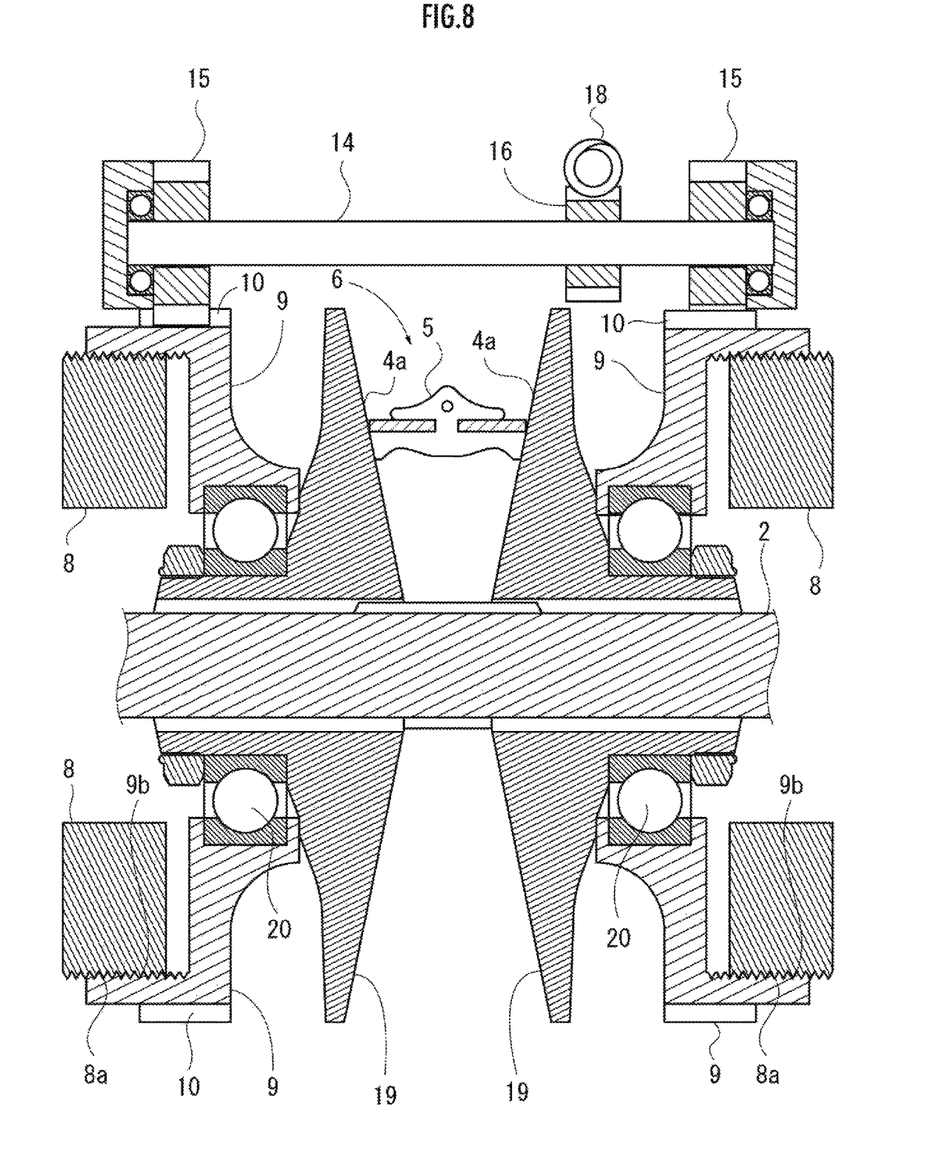
FIG. 8 is an explanatory diagram illustrating a third embodiment of a stepless transmission in accordance with the present invention.

Referring now to FIG. 8, a stepless transmission of a third embodiment in accordance with the present invention will be described. As compared with the stepless transmission of the first embodiment, the stepless transmission of the third embodiment has the same configuration as that of the stepless transmission of the first embodiment except that moving parts 9 do not have the tapered faces, pulley half main bodies 19 are provided in place of the pulley half discs 13, and the moving parts 9 and the pulley half main bodies 19 are relatively rotatable through deep groove ball bearings 20.

The pulley half main bodies 19 are splined to an input shaft 2, axially movable with respect to the input shaft 2, and rotated integrally with the input shaft 2.

Further, the pulley half main bodies 19 are relatively rotatably connected to the moving parts 9 through the deep groove ball bearings 20 and configured to axially move integrally therewith through the deep groove ball bearings 20. With this arrangement, as the moving parts 9 axially move, the pulley half main bodies 19 become axially movable.

As with the stepless transmission of the first embodiment, the stepless transmission of the third embodiment is also capable of maintaining the travel distances of the pair of the pulley halves 4 to be the same, thus making it possible to prevent the distortion of an endless transmission member 5 caused by unequal travel distances of the pair of the pulley halves 4.

DESCRIPTION OF REFERENCE NUMERALS

1 Input pulley
2 Input shaft (Rotating shaft)
3 Transmission case
4 Pulley half
4a Pulley face
5 Endless transmission member
6 V-groove
7 Bolt
8 Fixed part
8a Outer external thread (Threadedly engaged portion)
8b Cylindrical portion
8c Inner external thread (Threadedly engaged portion)
9 Moving part (First member)
9a Tapered face
9b Outer female thread (Threadedly engaged portion)
9c Inner female thread (Threadedly engaged portion)
10 Ring gear
11 Friction reducing part
11a Through hole
12 Roller
13 Pulley half disc (Second member)
13a Cylindrical portion
14 Pinion shaft
15 Pinion
16 Driven gear
17 Drive source
18 Drive gear
19 Pulley half main body
20 Deep groove ball bearing

The invention claimed is:

1. A stepless transmission comprising:
an input pulley and an output pulley, which have pulley faces forming V-grooves; and
an endless transmission member wound around the V-grooves of the input pulley and the output pulley to transmit driving force,
wherein each of the input pulley and the output pulley is composed of a pair of halves having the pulley faces,
the pair of halves of at least either the input pulley or the output pulley has:
a fixed part secured to a transmission case;
a first member which is fastened by threaded engagement to the fixed part so as to be axially movable and which has a ring gear to which rotation can be input from an outer periphery side, and
a second member which is relatively rotatable with respect to the first member and axially moved integrally with the first member, and which is contactable with the endless transmission member,
a rotating shaft is disposed at a center of rotation of the second member,
the second member rotates integrally with the rotating shaft,
driving force of a drive source is transmitted to a pair of the first members through an intermediary of the ring gear, and
wherein a plurality of threadedly engaged portions at which the first member and the fixed part of the half are fastened by the threaded engagement are provided with an interval existing in a radial direction of the half.

2. The stepless transmission according to claim 1, wherein spiral directions of the threadedly engaged portions at which the first members and the fixed parts of the pair of the halves are fastened by the threaded engagement are different from each other.

3. The stepless transmission according to claim 2, wherein a plurality of threadedly engaged portions at which the first members and the fixed parts of the halves are fastened by the threaded engagement are provided with intervals existing in a radial direction of the halves.

4. The stepless transmission according to claim 3, comprising:
a pinion which meshes with the ring gear; and
a pinion shaft which journals the pinion so as to rotate integrally with the pinion,
wherein the driving force of the drive source is transmitted to the pinion shaft thereby to rotate the first member.

5. The stepless transmission according to claim 1, comprising:
a pinion which meshes with the ring gear; and
a pinion shaft which journals the pinion so as to rotate integrally with the pinion,
wherein the driving force of the drive source is transmitted to the pinion shaft thereby to rotate the first member.

* * * * *